March 24, 1959 H. HARDY 2,878,523
METHOD OF MAKING RUBBER SHOES
Filed Jan. 18, 1954 6 Sheets-Sheet 1
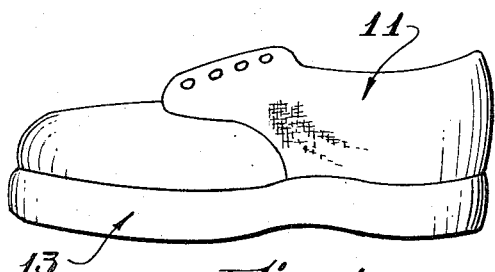
Fig. 1
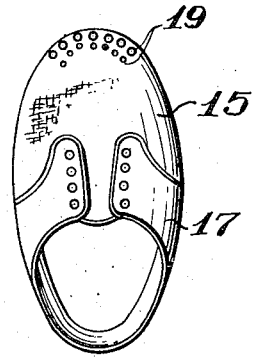
Fig. 2
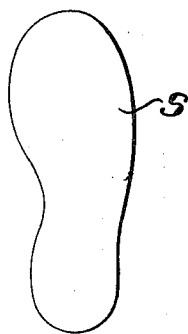
Fig. 4
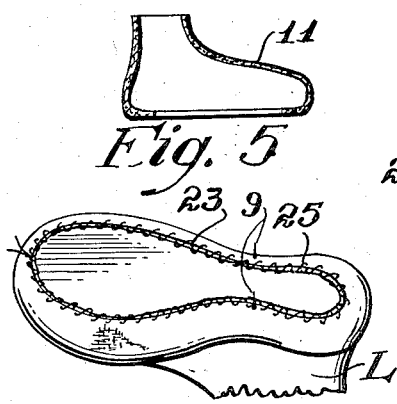
Fig. 5
Fig. 6
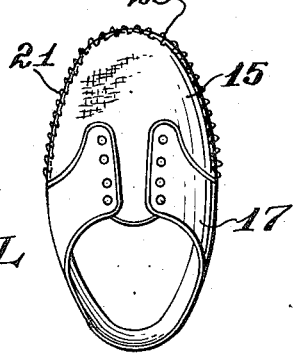
Fig. 3
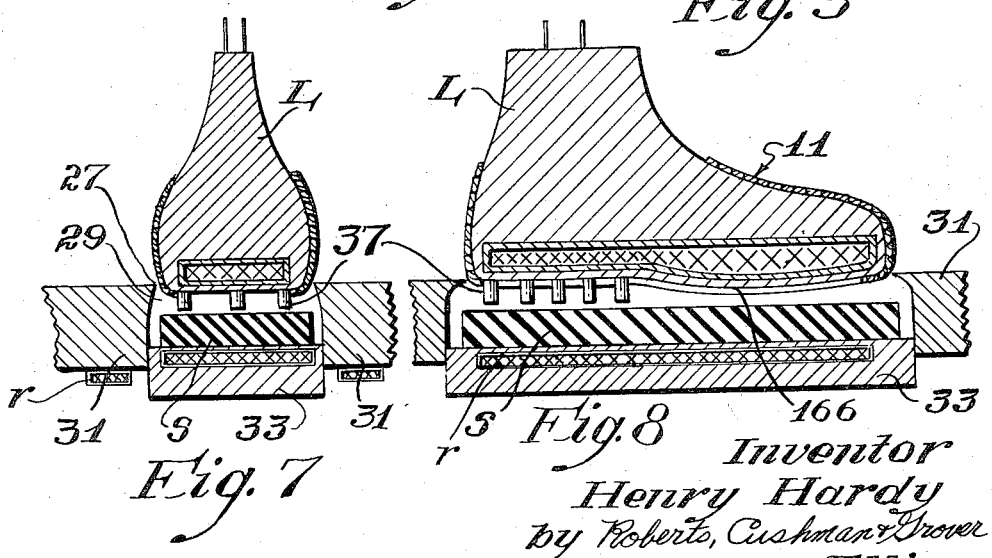
Fig. 7
Fig. 8
Inventor
Henry Hardy
by Roberts, Cushman & Grover
Att'ys.

March 24, 1959 — H. HARDY — 2,878,523
METHOD OF MAKING RUBBER SHOES
Filed Jan. 18, 1954 — 6 Sheets-Sheet 2

Inventor
Henry Hardy
by Roberts, Cushman & Grover
Att'ys.

March 24, 1959     H. HARDY     2,878,523
METHOD OF MAKING RUBBER SHOES
Filed Jan. 18, 1954     6 Sheets-Sheet 3

Inventor
Henry Hardy
by Roberts, Cushman & Grover
Attys.

March 24, 1959 H. HARDY 2,878,523
METHOD OF MAKING RUBBER SHOES
Filed Jan. 18, 1954 6 Sheets-Sheet 5
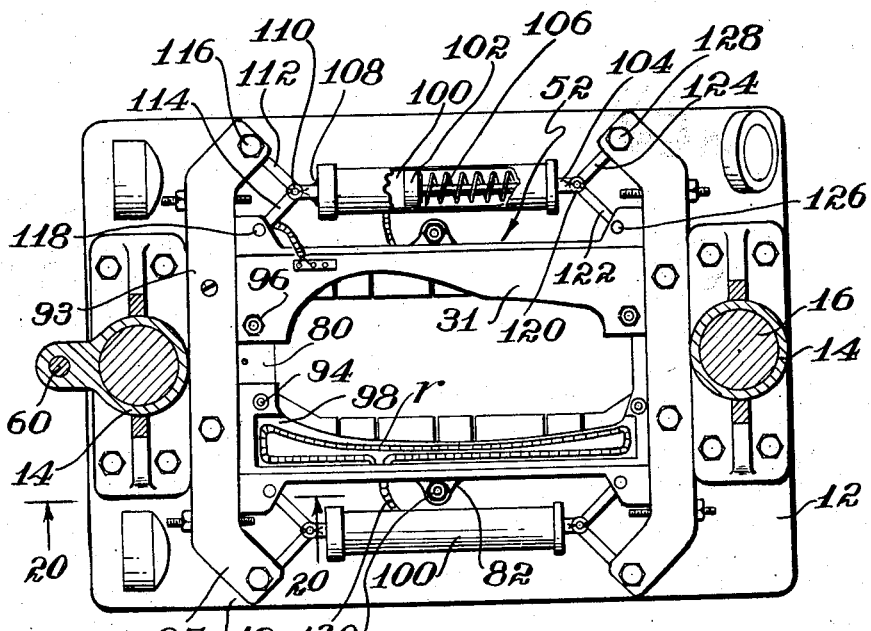
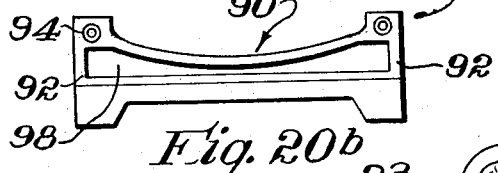
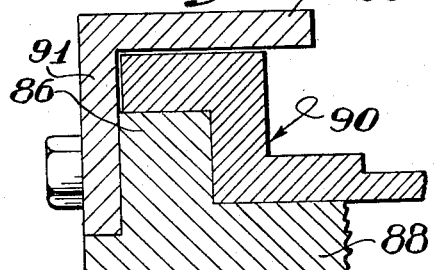
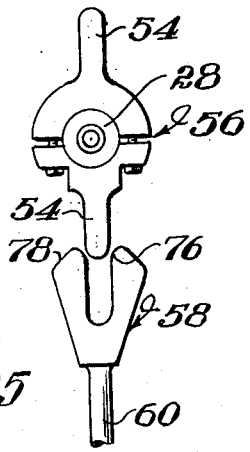
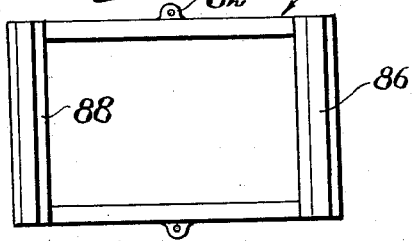
Inventor
Henry Hardy
by Roberts, Cushman + Grover
Attys.

March 24, 1959 H. HARDY 2,878,523
METHOD OF MAKING RUBBER SHOES
Filed Jan. 18, 1954 6 Sheets-Sheet 6
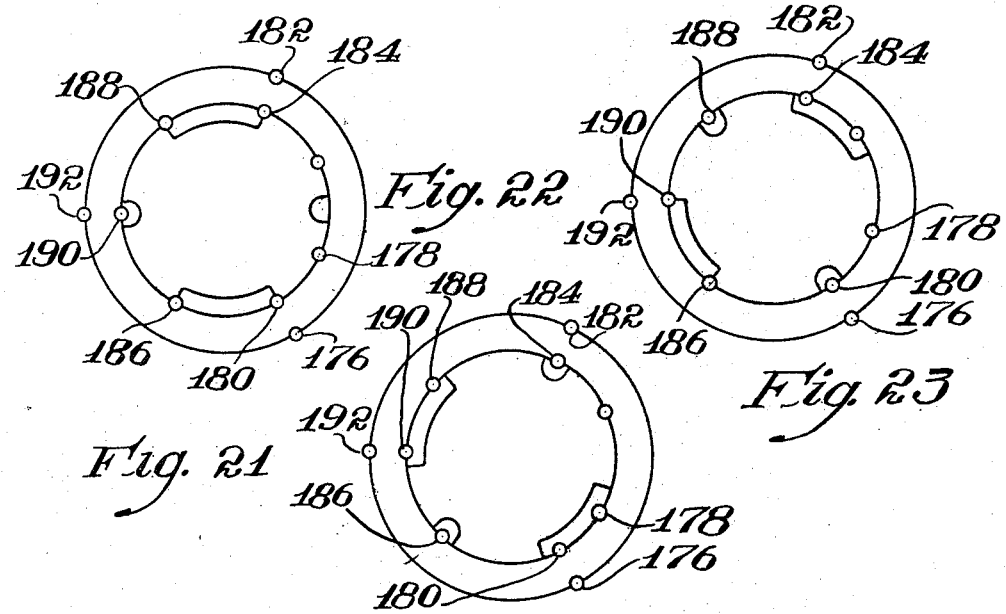
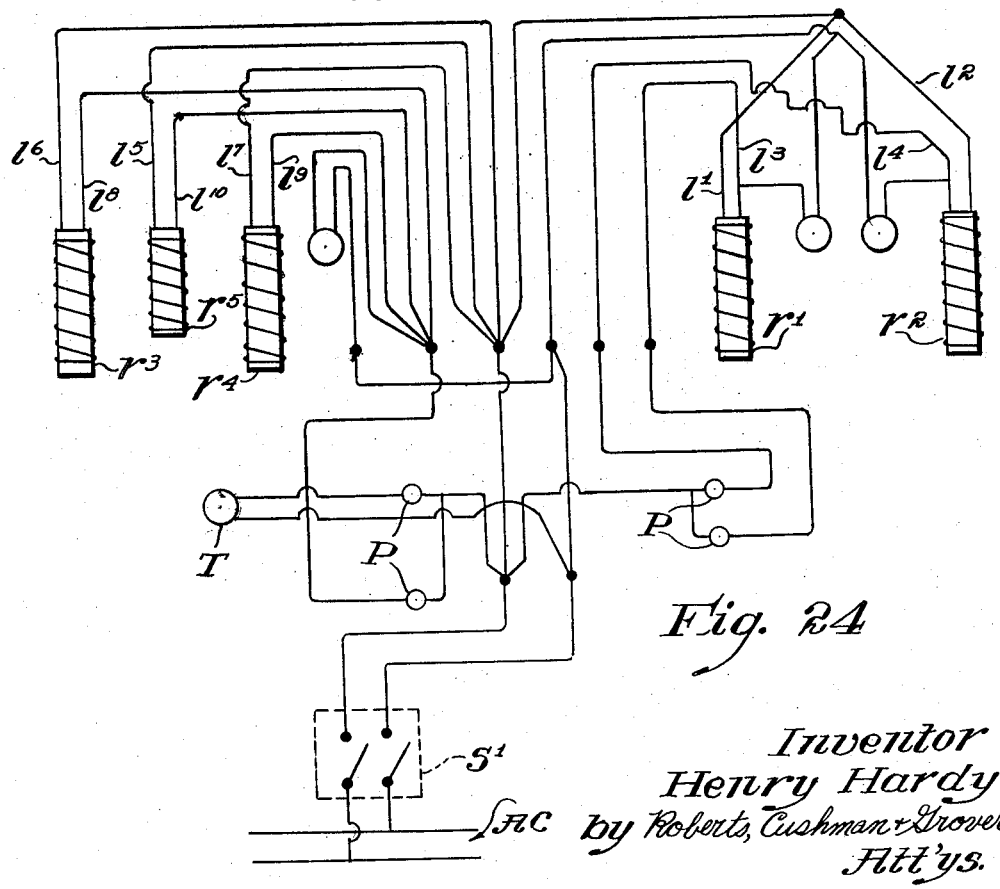
Inventor
Henry Hardy
by Roberts, Cushman & Grover
Att'ys.

United States Patent Office 2,878,523
Patented Mar. 24, 1959

2,878,523

METHOD OF MAKING RUBBER SHOES

Henry Hardy, Boston, Mass., assignor to International Vulcanizing Corporation, Boston, Mass., a corporation of Massachusetts Application January 18, 1954, Serial No. 404,608

6 Claims. (Cl. 18—59)

This invention relates to the manufacture of footwear and has for its principal object to provide an economically practical method for attaching outsoles to footwear by modifying the substance of the outsole while held in contact with the bottom of the footwear to cause it to adhere tenaciously thereto as distinguished from known methods of stitching, nailing and/or the use of an adhesive substance. Another object is to provide a method for attaching outsoles by the use of heat and pressure to effect attachment in a minimum time and simultaneously to mold the outsole to a predetermined shape and optionally to ornament the same. Another object of the invention is to improve the heat transfer to and through the substance of the sole and particularly through thickened parts of the sole such as the heel, shank and edges, so as to shorten time required to complete the attaching operation. Another object is to provide a method for attaching outsoles to foot coverings with or without insoles or internal layers of cork, felt or equivalent structure, at elevated temperatures without damaging the upper material. Another object is to provide a method of attaching sole blanks composed of rubber, rubber-like substance, plastic or a plastic-like substance or any equivalent substance which when heated will become plastically adhesive and will by vulcanization, fusion or a like phenomenon become permanently attached to the surface against which it is held during the application of heat thereto. Still other objects are to provide a method for attaching outsoles to footwear in which the upper is composed of canvas, fabric, rubber, leather and analogous materials. A still further object of the invention is to provide a method for attaching outsoles to footwear such as boots, shoes, slippers and other foot and leg coverings including leggings and the lower extremities of the leg coverings such as may be parts of garments.

For the purpose of simplifying the following, the description of the method of attaching outsoles will be confined largely to attaching rubber outsoles by vulcanization to the bottoms of canvas shoe uppers. It is to be understood, however, that the process according to the invention is applicable to the attachment of rubber soles or plastic soles to foot or leg coverings of any of the kind heretofore mentioned whether by vulcanization or fusion or any equivalent or analogous phenomenon. Hence when the term rubber and vulcanization are employed hereinafter, they are not intended in any way to be limiting.

In accordance with the foregoing objects, vulcanizing heat is supplied rapidly to the substance of the sole blank at the inner side thereof, either by omitting the insole or its equivalent so that the heated bottom of the last on which the upper is mounted has direct surface to surface contact with the inner side of the uncured sole, or by perforating the insole or other internal structure therein used so that specially provided heat transferring elements carried by the bottom of the last will project through the apertures into contact with the surface of the sole; by materially increasing the area of the inside surface of the sole so as to provide as greater surface area as possible through which heat can be supplied to the sole and by heating the inner, outer and edge surfaces of the sole.

In accordance with the preferred practice, the inner sole, midsole or any equivalent internal member is entirely omitted, the upper being lasted by the use of a draw string placed along the edge of its lasting margin so as to leave substantially the entire bottom of the last exposed. Alternatively, cross lacing, elastic webbing or tape placed across the bottom from lasting margin to lasting margin to draw the margins inwardly against the bottom may be employed. Preferably, rigid pins are fastened to the bottom of the last along the shank at both sides thereof over which the lasting margins at opposite sides are drawn and impaled to insure a snug fit, throughout the shank portion of the upper. To keep the upper taut and smooth on the last, means in the form of pins or their equivalent may be fastened to the upper part of the last for engagement with one or more eyelets or other openings in the upper. As thus lasted when the upper is placed in contact with an uncured sole blank, the metal last will have direct surface contact with the sole blank so that there is a maximum opportunity for heat transfer. When attaching the sole directly to the lasting margin without benefit of an insole or its equivalent, it is preferable to perforate the lasting margin or to place over-edge stitching along its edge to provide a series of loops therealong, through which the substance of the sole will ooze during vulcanization to make a more secure anchorage. Alternatively, the bottom of the last may be indented so that the substance of the sole flows over the inner side of the lasting margin. Preferably, there should be a sufficient flow of the rubber upwardly through the holes in the margin or through the indentations in the last bottom about the spaced edges of the lasting margin so as to spread inwardly over the inner side of the lasting margin, forming a smooth concave inner surface for comfortably cradling the foot. As thus constructed, the shoe has wearing qualities and strength at least as good as a shoe in which an inner sole is employed and a further advantage that it can be manufactured much more economically due both to the omission of the insole and to the elimination of the lasting operations involved in lasting the upper to an insole.

If an insole or other internal member is employed the method includes making perforations or openings in the insole or other member through which the last bottom will have substantially direct contact with the subjacent inner surface of the outsole.

In order to still further hasten the transfer through the substance of the sole, the inner surface area of the sole is preferably increased so as to provide for a greater contact with the heating means. This may be done by forming indentations in the surface, for example, shallow or deep holes depending upon the thickness of the sole and the part in which the indentations are made. The holes may be made prior to bringing the last into engagement with the sole, for receiving the pins carried by the last bottom, or pressed into the sole by forcing the latter into engagement with the bottom of the last to which the pins are fixed. The pins will conduct heat from the last bottom to the surface of the sole and into the substance of the sole subjacent to its surface. After vulcanization the protrusions or pins may be readily withdrawn from the sole and will leave holes therein. Making the aforesaid holes in the sole not only improves uniformity of heating during vulcanization and faster vulcanization but is beneficial in that it reduces the amount of rubber necessary to form the sole, reduces the weight of the sole and also affords ventilation for the foot. If the holes are objected to, they may be filled with cork or felt or covered with a sock lining.

In accordance with a still further aspect of the invention, heat is also applied to the bottom or outer side of the sole and to its edges by way of the mold which is heated, the latter having a surface designed to impart the proper shape and ornamental characteristics to the sole. While the amount of heat applied by the last and mold may be about the same so that heat enters both surfaces of the sole and penetrates toward the center at about equal rates, it is preferable to supply heat to the inner side of the sole at a faster rate than the outer side. This may readily be accomplished by supplying more heat to the last bottom than to the mold parts. While the higher temperature applied to the inside of the sole may result in some overvulcanization, this is not especially harmful since the inner side of the sole is not required to absorb abusive wear. Care should be exercised, however, not to damage the upper by excessive heating, hence the heating elements in the lasts are desirably confined to the bottom thereof and are insulated from the sides as will appear hereinafter.

While the method has been described as one for attaching rubber and plastic soles which in its ordinary meaning might be construed to apply exclusively to solid compositions, it is within the scope of the invention to use the same method in its various aspects for attaching sponge rubber soles or soles comprised of a rubber or rubber-like composition containing a blowing agent which during the application of heat will generate gas within the substance of the sole causing it to expand within a mold of predetermined shape wherein the pressure for holding the sole in engagement with the upper during vulcanization is derived solely from the expansion caused by actuation of the blowing agent.

The principal object of the apparatus is to provide means for carrying out the aforesaid method in an expedient manner. Further objects are to provide an apparatus for holding the lasting margin of an upper in contact with the inner surface of an uncured sole blank and effecting a rapid transfer of heat to and through the substance of the sole blank to effect vulcanization thereof. Another object is to provide an apparatus for carrying out the heating with pressure to improve the contact of the sole blank with the upper during vulcanization. Another object is to provide an apparatus in which by substitution of the parts thereof, right and left shoes may be operated upon. Another object is to provide an apparatus in which the pressure against the bottom of the last during vulcanization is distributed so as not to tilt the last with respect to the plane of its bottom. Further objects are to provide an apparatus in which the last and mold parts may readily be dismantled and replaced by parts of different size and style and in which the parts may be easily, conveniently adjusted with respect to each other. Other objects are to provide an apparatus in which the last and mold parts are heated at all times and in which the heat supplied to the last is confined principally to the bottom thereof. Still further objects are to provide mold members which will impart the desired shape to the sole and/or decorative characteristics thereto during attachment. Still further objects are to provide mold parts which are brought together with power operated means including means for resisting separation of the mold plates during vulcanization independently of the power operated means.

The apparatus as herein illustrated for carrying out the method comprises essentially opposed pressure applying members movable into engagement to apply pressure to the opposite surfaces of an uncured sole blank including the lasting margin of an upper placed against the inner surface thereof. The aforesaid members take the form of a mold and a pair of lasts alternatively cooperable with the mold, movement of one of the lasts into operative relation with the mold being accompanied by movement of the other to an inoperative position conveniently accessible for mounting an upper thereon. The lasts are mounted, for movement about a horizontal axis, on a shaft at diametrically opposed positions, the shaft being rotatable to bring one last at a time into an operative position above the mold and vertically movable to lower the last into engagement with the mold beneath it. Centering means in the form of interengageable elements carried by the shaft and the mold support, guide the selected last as it is lowered into engagement with the mold so as to effect proper registration thereof with the mold or if it is too far out of alignment deflects the last to an out-of-the-way position so that it clears the subjacent structure. The shaft is vertically adjustable to vary the vertical spacing of the last with reference to the mold, and the lasts themselves are adjustably fastened to the shaft for movement bodily longitudinally and transversely of the axis of the shaft, angularly about axes intersecting the axis of the shaft and angularly about the last-named axis.

The mold means comprises a pair of edge plates and a bottom plate, the edge plates being movable into engagement to define with the bottom plate a mold cavity corresponding in shape to the shoe bottom. Movement of the edge plates is effected by power operated means including toggle linkage which when straightened bring the plates together to define the mold cavity, the line of centers of the toggle elements when the plates are engaged, being perpendicular to the direction of movement of the plates so that forces tending to separate the edge plates during vulcanization are taken up entirely by the linkage independently of the power operated means. The edge plates are removably mounted on a rigid frame subjacent to the lasts and the latter is adjustable both transversely and longitudinally with reference to the bottom plate. The bottom plate of the mold is loosely fastened to the frame of the apparatus independently of the edge plates and the supporting frame so that it can rock slightly and is vertically movable with reference to the side members to apply pressure to the underside of the sole blank while the upper side of the sole blank is constrained by contact with the bottom of the last at its edges by the edge plates of the mold.

Heating elements are placed in the bottoms of the lasts, beneath each of the edge plates of the mold and beneath the bottom plate of the mold and are supplied with current to keep them hot continuously during operation of the apparatus.

The invention will now be described in greater detail with reference to the accompanying drawings wherein:

Fig. 1 is a side elevation of a shoe such as may be made in accordance with the practice of the method illustrated herein;

Fig. 2 is a plan view of an upper assembly provided with a plurality of holes in its lasting margin;

Fig. 3 is a plan view of an upper assembly provided with over-edge stitching along its lasting margin;

Fig. 4 is a plan view of an unvulcanized sole blank;

Fig. 5 is a vertical longitudinal section through a molded upper;

Fig. 6 is a perspective of the bottom of a last with an upper string-lasted to it;

Fig. 7 is a transverse vertical section through a last and mold means showing the relation of the parts prior to application of pressure and heat to effect vulcanization;

Fig. 8 is a longitudinal vertical section showing the relation of the parts prior to the application of pressure and vulcanizing heat;

Fig. 18 is a top view of the machine with the last supporting means omitted so as to clearly show the subjacent mold;

Fig. 19 is a fragmentary rear elevation of the machine showing the centering fork and fingers;

Fig. 20 is an enlarged fragmentary section taken on the line 20—20 of Fig. 18;

Fig. 20a is a plan view of the supporting frame for the mold halves;

Fig. 20b is a plan view of one of the slide members for the mold halves;

Figs. 21, 22 and 23 are diagrammatic views of the pneumatic control valve;

Fig. 24 is a wiring diagram for the resistance heating elements; and

Fig. 25 is a plan view of a washable sock lining with felt pads attached thereto.

Figures 9, 10, 11:
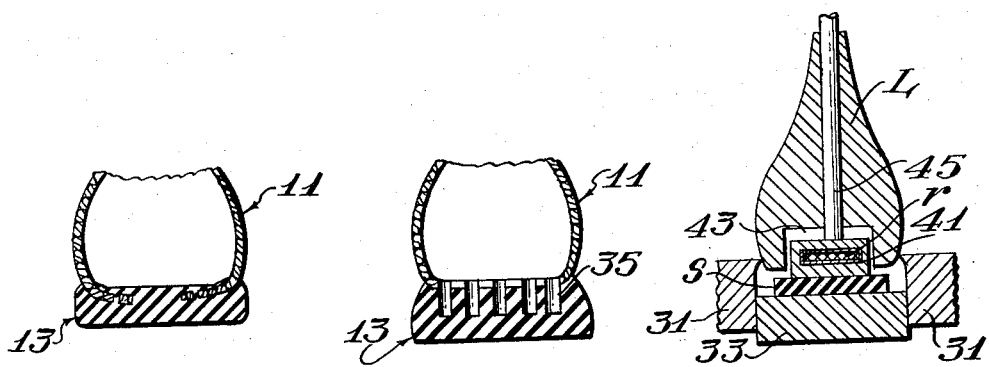
Fig. 9 is a transverse vertical section through the forepart of a finished shoe.
Fig. 10 is a transverse vertical section through the heel end of a finished shoe.
Figs. 11 and 12 show vertical sections through modified forms of lasts designed to form an enlarged cavity in the inner forepart of the sole.

Referring to the drawings, the invention illustrates the method in its application to the manufacture of shoes having a fabric or leather upper 11, and an outsole 13 of rubber or plastic with or without a filler. The sole is thick at its heel throughout its shank and at its edges. The thermal conductivity of the substance of the sole is very low, hence it is economically impossible to try to attach soles of this thickness by vulcanization because of the length of time required to effect vulcanization at temperatures which are compatible with good shoe construction. If the temperature is raised sufficiently high to shorten the vulcanizing time to a point where it is economical to manufacture, the excessive heat damages both the upper and the sole.

In accordance with the present practice, however, it has been found possible as will now be described, successfully to attach thick solid rubber outsoles and the like to the lasting margin of a canvas upper or a leather upper with or without benefit of an insole or the equivalent in a very short operating time in comparison to any prior methods without in any way overheating the parts and sacrificing sound shoe construction. In accordance with the practice, as exemplified herein, the upper material is prepared in conventional fashion by stitching the vamp 15 and quarters 17 so as to provide a circular upper assembly as shown in Figs. 2 and 3. If the upper is a coarse woven fabric through which the plasticized rubber of the sole blank would easily penetrate during vulcanization, no additional preparation of the upper is required, however, if it is of a very tight weave it is desirable to make a series of perforations 19 along the lasting margin (Fig. 2) or alternatively a line of over-edge stitching 21 (Fig. 3) so as to provide a series of loops along the edge.

In the preferred practice of the method where the insole is omitted, a draw string 23 is placed at the edge of the lasting margin, for example, in specially prepared stitching 25 (Fig. 6) along the edge of the margin or by use of the stitching 21 as shown in Fig. 3. The upper with the draw string incorporated at its edge is then placed on a metal last L and its lasting margin is drawn snugly in over the bottom of the last by tightening the draw string. In order to insure a snug fit at the opposite side of the shank, the last bottom (Fig. 6) is preferably provided with one or more sharp pins 9 at each side over which the lasting margin may be drawn and impaled. While the draw string 23 is described as the preferred way of snugly fitting the upper on the last, various other means may be employed, for example, crisscross lacing, elastic tapes, webbing and so forth. Moreover, it is possible to set pins along the bottom of the last at the shank and secure the desired gathering of the lasting margins at the shank by impaling them on the pins. The top part of the upper is prevented from being drawn down out of position by temporary lacing, in the eyelet strip, or pins or the equivalent, fastened to the last over which the eyelets or other openings in the upper may be caught. If an insole or midsole is employed, it will not be necessary to employ any of the foregoing means since the upper can then be slip-lasted in a conventional manner. The upper mounted on the last by string lasting or its equivalent or its equivalent or by conventional lasting is then brought into sealing engagement with the rim 27 of a mold cavity 29 (Figs. 7 and 8) in which has been placed an uncured sole blank S. Briefly, the mold consists of relatively movable edge plates 31—31 and a bottom plate 33 cooperably associated to define a mold cavity 29, corresponding in shape to the shape of the bottom desired to be applied to the shoe which may be brought together in such fashion as to apply pressure to opposite surfaces of the sole blank while the inner side thereof is in contact with the lasting margin and to supply heat thereto to effect vulcanization. In accordance with the invention, heat is supplied, to effect vulcanization, through the last, through the side mold members and through the bottom mold member. While it was not unusual in prior apparatus to heat the last upon which the upper was mounted during the attaching operation, such heating was nullified because no provision was made for transmitting the heat through the insole or other filler, which being a very good insulating member effectively prevents heat transfer. Moreover, such efforts as were employed to reduce the length of time required to effect vulcanization were directed to raising the temperature gradient in an attempt to force the heat through the sole at a more rapid rate but these failed because the high temperature employed overvulcanized the surfaces of the sole and in many cases damaged the upper. The foregoing difficulties have been overcome in accordance with the practice of the present invention by supplying heat directly to the inner surface of the uncured sole blank by making sure that the heated metal surface of the bottom of the last or some part thereof has direct contact with a substantial area of the inner surface of the sole and with the interior subsurface portion of the sole especially in the thicker parts thereof supplemented by bottom heating or outer heating, and edge heating. Preferably, as illustrated in Figs. 7 and 8, the insole is omitted so that the heated bottom of the last has direct surface contact with the inner surface of the uncured sole and is held in intimate engagement therewith under pressure during the molding operation so that there is a maximum heat transfer from the surface of the last bottom to the surface of the sole. To further increase the flow of heat to and through the sole and to hasten vulcanization, the method contemplates increasing the available area for heat transfer at the inner side of the sole, for example, by making indentations or holes 35 (Figs. 10, 13, 14 and 15) therein, into which protrusions or pins 37 fastened to the bottom of the last extend, conducting the heat directly from the last bottom into the substance of the sole subjacent to its inner surface. Heat is also supplied to the outer side of the sole through the bottom part of the mold and to the sides of the sole through the edge plates of the mold so that heat penetrates the sole from all surfaces toward the center thereof at such a rate as to produce a substantially uniform vulcanization throughout all parts of the sole at about the same time. In practice, the time for effecting vulcanization may still be further shortened without detrimentally affecting the sole by supplying a great amount of heat to the bottom of the last so that vulcanization takes place primarily by a transfer of heat from the inside of the sole outwardly. A higher heat may safely be employed in the bottom of the last because some overvulcanization of the inside of the sole has no detrimental effects and because it is not required to take wear and hence can be tolerated. In the event that an insole is employed, the latter is provided with a plurality of openings located so that the protrusions or pins 37 on the last will extend through them and hence be brought into direct contact with the inner surface of the sole and the holes 35 made therein, so that even when an insole is used a rapid and effective transfer of heat from the last to the inner surface and substance of the outsole may be effected.

Figures 13, 15:
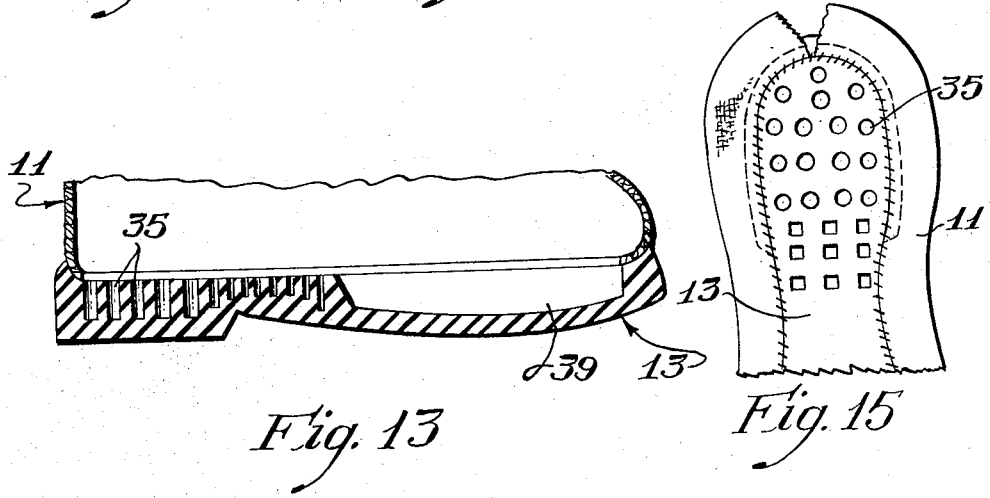
Fig. 13 is a longitudinal section through a shoe having an enlarged cavity in its inner side at the forepart and thick marginal walls.
Fig. 15 is a plan view of the inside of the sole of the shoe shown in Fig. 13, at the heel end thereof.

The heel end and shank of the conventional rubber outsole is generally considerably thicker than the forepart as is illustrated in Fig. 13, and hence the time required for completing vulcanization to the interior of the heel and shank portions would be proportionately greater than the sole. Accordingly, the pins 37 are for the most part confined to the heel end and shank portions of the last bottom. These protrusions or pins 37 may be of circular or rectangular cross section and will leave holes in the sole after the vulcanizing operation is completed. These holes, however, are not objectionable since it is customary to place a sock lining in the bottom of the shoe and this will cover the holes and if the sock lining is not sufficient to cover them they may be filled in with plugs of cork, felt or the like. On the contrary the holes lighten the sole, so that less rubber is required for a given sole and provides for ventilation of the foot. This latter feature is of considerable importance since rubber and plastic soles are generally regarded as inducing perspiration, however, with the holes this condition will be alleviated as each hole will act as a small cup which will hold a given volume of air when uncompressed and will expel the air as it is compressed. The action of the holes in alternately taking up air and expelling it will result in a constant flow or change of air in around the feet and hence will alleviate or at least reduce conditions inducive to perspirations.

Figures 12, 14:
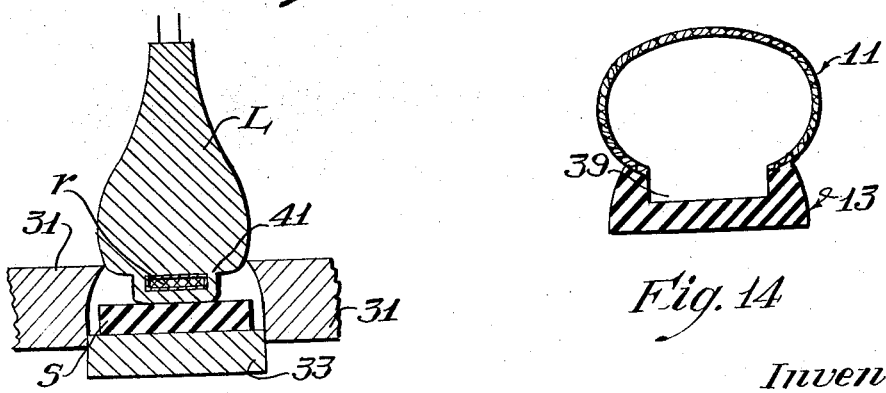
Fig. 14 is a transverse section through the forepart of the shoe shown in Fig. 13.

The forepart of the shoe illustrated in Fig. 9, is of uniform thickness from edge to edge, however, in some shoes, such as shown in Figs. 13 and 14, it is desirable to have a large cavity 39 at the forepart of the sole or throughout the entire length of the sole for reception of a felt or cork pad and at the same time preserve the edge thickness. This is accomplished by using a last, such as shown in Figs. 11 or 12, having at the bottom of its forepart or throughout the entire length, a protrusion or protruding part 41 corresponding in dimension to the cavity desired, which will be forced into the uncured sole during vulcanization so as to displace the substance thereof laterally and when withdrawn will leave the desired cavity. In Fig. 11, the bottom of the last at the forepart has a recess 43 in it, in which is located a block constituting the protrusion which is fastened to the lower end of a rod 45 extending upwardly through the last. The rod is operable by depression to push the block downwardly from its recess 43, so that its lower end protrudes from the bottom of the last. By adjustment of the rod the block may be extended to form whatever depth recess is desired. Movement of the block downwardly affords means for applying pressure to the blank during vulcanization so that if desired the movable bottom mold may be dispensed with and an inexpensive fixed bottom mold be substituted therefor. A resistance coil is located in the block and is supplied with current from conductors extending through the rod. Alternatively, the last may as shown in Fig. 12, have a permanent protrusion 41 formed integral with its bottom portion.

Figs. 13 and 14, specifically illustrate one form of cavity which may be formed and later filled with a blank of felt or cork. It is contemplated that the sock lining may have the cork or felt pad adhesively secured to its underside so as to facilitate inserting and removing the pad and hence making it possible either to wash the pad if it is susceptible to such treatment or to replace it with a new one and hence to keep the inside of the shoe sanitary and in good condition throughout the life of the shoe.

The walls of the cavity are deep and thick and the heel and shank are also thick, nevertheless, uniform vulcanization is secured by the combined use of the pins 37 and protrusion 41. The pins transfer heat directly to the substance of the sole at the heel and shank and the protrusion transfers heat to the inside of the thick edge portions of the sole.

The foregoing has been described with reference to making canvas top shoes, however, the same procedure is applicable to leather top shoe uppers with minor changes in practice. When using a leather upper, it is preferable to premold it so as to turn its lasting margin inwardly as illustrated in Fig. 5, prior to mounting it on the last. With such premolding, the upper may be placed on the last and the lasting margin will fit snugly about the bottom of the last. Since the leather of the upper is usually quite dense the surface of the lasting margin should be roughened to remove the grain especially when the surface has been previously treated so that it has a smooth hard finish. Furthermore, it is preferable to perforate the lasting margin or to apply over-edge stitching to its edge to improve anchorage. Other than the foregoing, the method is carried out exactly the same as the way heretofore described with reference to canvas uppers.

The method is also applicable to attaching rubber outsoles to rubber shoes, as for example, boots, overshoes and the like, in which event the sole will be vulcanized to the lasting margin of the rubber shoe by the same procedure heretofore described with reference to canvas and leather shoe uppers.

In certain countries, the lower extremities of the leg portions of outer wear such as overalls, coveralls and garments intended for outdoor use, such as children's windbreakers and the like, have been treated to receive a bottom member in the nature of an outsole of rubber by folding the lower edge of the leg extremity inwardly in the same fashion as the lasting margin of a shoe upper and sewing or adhesively securing the outsole thereto. It is apparent that the present method is useful for attaching rubber and plastic soles to such garments by vulcanization and/or fusion.

It is evident from the foregoing that the important aspect of the present invention resides in effecting a heat transfer through a comparatively non-conductive material rapidly by increasing and improving the surface contact between the heating elements and the substance of the material to be vulcanized by introducing heat from opposite sides and internally thereof.

Figure 16:
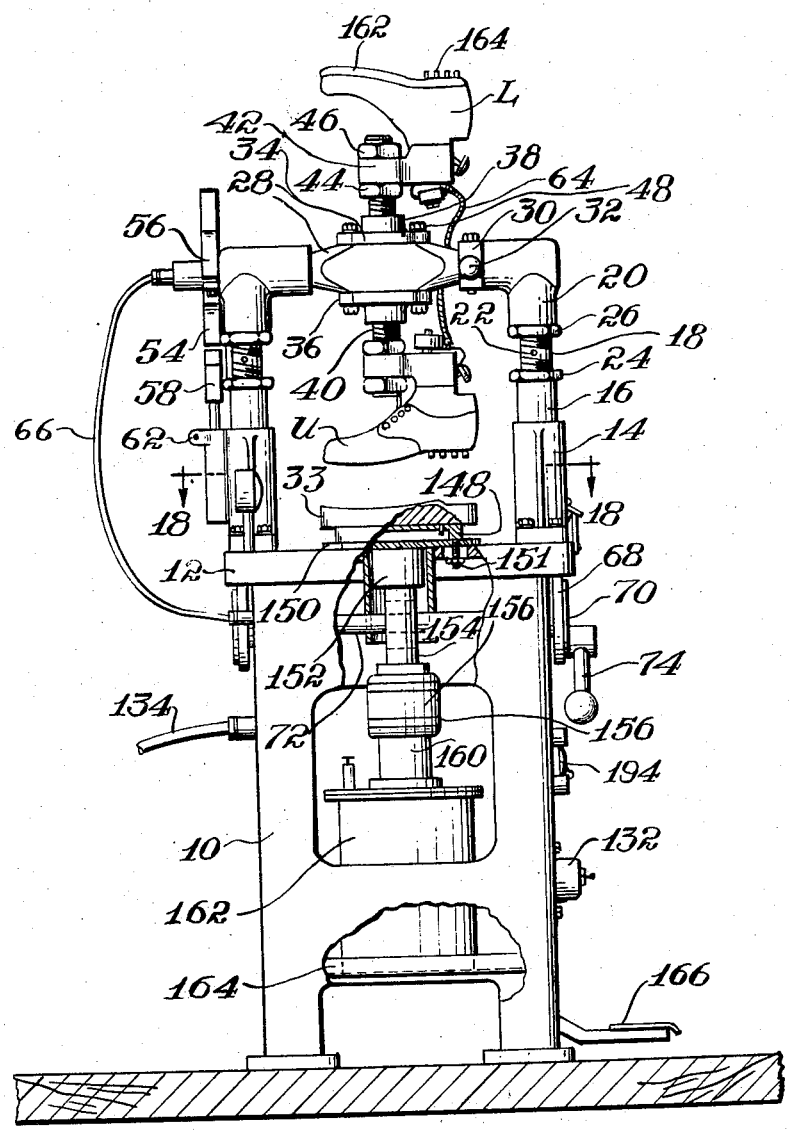
Fig. 16 is a side elevation of a machine for carrying out the method described herein with the edge plates and supporting structure of the mold omitted to clearly show the bottom plate of the mold.
Figure 17:
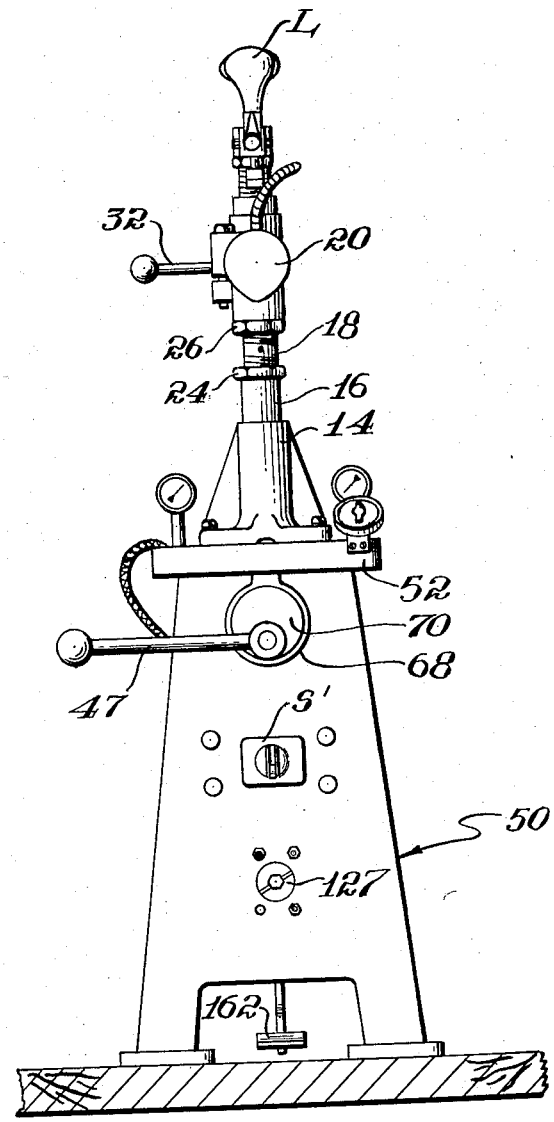
Fig. 17 is a front elevation of the machine.

An apparatus for carrying out the method in its various aspects is illustrated in Figs. 16 through 24, and consists primarily of means for supporting the lasted shoe upper and the uncured rubber sole blank in contact with each other during the application of pressure and heat to effect vulcanization of the uncured sole blank directly to the upper. The apparatus comprises a substantially rectangular base 10 which may be a casting or may be fabricated of sheet metal having fastened to its top a rigid substantially rectangular bed plate 12. At opposite sides of the bed plate there are fastened stanchions 14 in which are mounted vertically slidable sleeves 16. The upper end of each sleeve 16 has mounted in it a nipple 18 which supports at its upper end a bearing member 20. Each nipple is threaded at both ends for engagement with screw threads in the sleeve and bearing, the threads at the opposite ends of the nipple being right and left handed. Each nipple has a hole 22 through it for receiving a handle by rotation of which the bearing members 20 may be adjusted vertically with respect to the bed plate 12. Nuts 24 and 26 mounted on the threaded portions of the nipples provide for locking the parts after they have been suitably adjusted. The bearing members 20 have horizontal bearing openings therein, in which the opposite ends of a shaft 28 are mounted for rotation about a horizontal axis. A split clamp ring 30 is fastened near one end of the shaft, the right end as seen in Fig. 16, adjacent the bearing at that side and has projecting laterally from it a handle 32 by means of which the shaft may be rotated. The journaled ends of the shaft 28 are of circular cross section, however, the central portion thereof is of substantially rectangular cross section having flat surfaces 34, to which last supporting brackets 36 are bolted. Each bracket 36 carries a ball socket 38 in which there is a ball having a threaded stem 40 projecting therefrom on which is mounted a pivot arm 42. The pivot arm is fixed to the stem 40 by nuts 44 and 46 engaged with its opposite sides and may be vertically adjusted on the stem by repositioning the nuts and also adjusted angularly about the vertical axis of the stem by loosening the nuts and turning the arm and then tightening the nuts against opposite sides of the bracket. Angular adjustment about the lower end of the axis of the stem 40 is afforded by the ball at its lower end and may be fixed at any angular position by tightening the bolts 48, fastening the bracket to the shaft. The bolt holes in the bracket 36 through which pass the bolts 48 are enlarged so that adjustment axially of the shaft and transversely thereof may also be attained. A metal last L is fastened to the arm 42 with its bottom facing away from the axis of the shaft 28. Each arm 42 extends laterally from its stem 40 so that the last is offset with respect to the axis of the stem. This compensates for the lever action which would normally tend to tilt the forepart of the shoe with respect to the heel during the application of pressure and hence insure a more uniform application of pressure to the sole. This is important for during vulcanization, the sole is plastic and excessive pressure at one end or the other would tend to displace the substance of the sole so that it would not be uniform. There are two lasts L mounted diametrically opposite each other on the shaft 28 and by turning the shaft, one last or the other may be moved from an inverted position at the top side of the shaft to an upright position at the bottom side of the shaft. In its inverted position the last is conveniently located for fitting a shoe upper U thereto. This is accomplished by placing an upper such as shown in Figs. 2 and 3, on the last and then gathering its lasting margin inwardly over the marginal edge of the bottom of the last, for example, by string-lasting as heretofore described and by the further expedient of impaling the lasting margin on the pins 25 at the shank, as illustrated in Fig. 6, so as to hold the upper snugly in place at the shank. After the upper has been mounted on a last the operator grasps the handle 32 and rotates the shaft 28 to bring the lasted upper into its vertical position below the shaft directly above molding and pressure applying means (Fig. 16) located below the shaft on the bed plate 12, between the stanchions 14. In order to insure perfect centering of the last with respect to the molding and pressure applying means 52 (Fig. 18) diametrically opposed, radially extending centering fingers 54 (Fig. 19) are fastened to the shaft 28 at the outside of the left hand bearing 20 by means of a split clamp 56 for engagement with a centering fork 58 as will appear hereinafter. The centering fork is fast to the upper end of a stem 60, the lower end of which is vertically adjustable in a vertical hole in the stanchion 14, the wall of which is split vertically and may be drawn together into clamping engagement with the stem by a bolt 62.

Both lasts are heated at all times by resistance elements set into the bottoms thereof, which are connected by flexible cables 64 running through an axial hole in the shaft 28 to a common cable 66 which is connected in suitable fashion to an outside source of power. Suitable thermostats are provided at each last to control the temperature within close limits.

The lasts L when rotated into operative position are vertically spaced from the mold and pressure applying means 52, so as to leave space to facilitate placing an uncured sole blank S, such as shown in Fig. 4, beneath it on the bottom of the mold. In order to lower the last located in upright position above the mold into contact with the rim of the mold, the shaft 28 is lowered by drawing the supporting sleeves 16 vertically downward in the stanchions 14. This is effected by connecting the lower ends of the sleeves 16 to straps 68 which surround eccentrics 70 fastened to the opposite ends of a horizontally arranged shaft 72 journaled near its ends in the walls of the frame 10. A handle 74 is fastened to one end of the shaft 72 providing for rotation thereof, and hence rotation of the eccentrics 70 so as to draw the sleeves 16 downwardly when it is desired to bring the lasted shoe into engagement with the mold and to re-elevate it after the vulcanization has been completed. While this vertical movement as illustrated herein is accomplished mechanically as just described, it is within the scope of the invention to effect this vertical movement with other and equivalent mechanical mechanism or by means of conventional hydraulically operated piston and cylinder assemblies.

As the last is drawn downwardly toward the mold means 52, if the operator has failed to rotate the shaft 28 so that it is perfectly aligned with the mold means, such alignment will be perfected by entrance of one of the centering fingers 54 into the fork 58, the tines of which as will be seen by reference to Fig. 19, have downwardly and inwardly inclined surfaces 76 which guide the finger into the slot. If the shaft is so far out of line that the finger 54 does not enter the slot, the fork also functions to deflect the finger in one direction or the other far enough so that the last will not inadvertently be brought down into engagement with the side of the mold means so as to cause damage to the parts. For this purpose, the outer side of the tines have downwardly and outwardly sloping surfaces 78 which deflect the last in one direction or the other to a point where it will clear any subjacent structure.

The molding and pressure applying means 52 located below the last supporting means on the bed plate is comprised of a rigid rectangular base frame 80 (Fig. 20) having its opposite sides laterally projecting lugs 82 through which bolts 84 are inserted and threaded into the bed plate for fastening it securely thereto. The holes in the lug 82 are made large enough so that the frame may be shifted both longitudinally and transversely of the base plate a small amount thereby providing for adjustment of the base frame with respect to the last support above it. The base frame 80 has spaced parallel upstanding ribs 86 (Figs. 20 and 20a), and horizontal shoulders 88 at its opposite ends. A pair of slide plates 90 (Fig. 20b) having flanged ends 92, rest on the shoulders 88 and are slidable thereon, so that the plates 90 are movable to and from each other. The slide plates are held against vertical displacement by angle bars 91 bolted to the ends of the frame 80 which have horizontal flanges 93 overlying the ends of the plates 90. The opposite ends 95 of the angle bars 91 extend longitudinally beyond the frame for a purpose which will appear hereinafter. Each of the plates 90 have at each end an upwardly projecting threaded stud 94 and mold halves 31—31 (Figs. 7 and 8) are placed on the plates over the threaded studs, having holes therein for this purpose and are fastened thereto by nuts 96. Each mold half 31 is cut away at its inner side so as to have an opening corresponding to one half of a shoe longitudinally thereof as shown in Fig. 18 and the vertical wall of the opening is shaped to give the desired edge formation to the sole as shown in Figs. 7 and 8. The wall for the most part is substantially vertical so as to permit vertical movement of the bottom of the mold 33 (Figs. 7 and 8) therein, without binding and has near its top an inwardly projecting curved lip or rim 27 designed to engage the surface of the upper substantially at the shoulder where the lasting margin is turned inwardly over the last bottom. The side plates 90—90 as will be seen by reference to Figs. 18 and 20b, have shallow recesses 98 at their upper sides in which are placed resistance coils r for heating the mold halves fastened thereto. Movement of the mold halves toward each other to bring them into operative position prior to vulcanization and to separate them following vulcanization so that the shoe may be removed, is effected by a pair of air operated cylinders 100. As illustrated, each cylinder contains a piston 102 and rod 104, which extends from one end. A heavy coil spring 106 surrounds the rod internally of the cylinder at one side of the piston and normally operates on the piston in a direction to hold the rod retracted. Alternatively, a double acting piston may be employed, that is one which is actuated in each direction of its movement by air pressure. One end of the cylinder has a bifurcated stud 108 fast thereto, having in its tines, holes for receiving a pin 110 to which is pivotally connected a pair of links 112 and 114, the opposite ends of which are pivotally connected respectively by pins 116 and 118 to one extremity of the angle bar 91 and to one end of one of the slide plates 90, thus forming a toggle linkage. A similar toggle linkage is provided at the opposite end of the cylinder by a bifurcation at the end of the piston rod, the pin 120 and links 122 and 124, pivotally connected by pins 126 and 128 to the slide plates 90 and the angle bar 91 at this end. By supplying air to the cylinders 100 so as to extend the piston rods from the cylinders, the toggles are straightened, thus pushing the slide plates 90 inwardly toward each other. In operation of the apparatus very little force is required to push the mold halves inwardly into operative position since at this time there is nothing resisting the inward motion of the plates. In other words, the shoe is not in engagement with the mold halves at that time and the uncured sole blanks being smaller in size than the mold openings (see Figs. 7 and 8) offer no resistance whatever to movement of the plates inwardly. Accordingly, it is not necessary to employ very powerful cylinders or very high pressure to effect this movement. During the molding operation, however, the pressure exerted to separate the plates is comparatively high and hence a very considerable force would be required to hold the plates together during this period. By employing the toggle mechanism described, in which the links are put into straight line position by the air cylinders prior to the vulcanizing operation, the entire force exerted on the mold plates during the vulcanization process is resisted by the links so that no strain is put on the cylinders at all. After vulcanization, very little force is necessary to break the toggle linkage and the plates may be returned to their inoperative position so as to permit moving the finished shoe. Air is supplied to the cylinders 100 through conduits 130 connected by way of the three-way valve 132 to an air hose 134.

The mold halves or plates 31—31 constitute the side members of the mold and operate on the edges of the sole blank during vulcanization to give it the proper shape. The bottom of the mold is constituted by a bottom plate 33 which rests on, and is secured to a block by bolts. The bottom plate 33 (Fig. 16) corresponds in shape to the bottom of the sole fitting exactly within the lower side of the opening defined by the mold halves 31—31 when they are brought together and being slidable vertically within its opening.

The block 148 is hollow and rests on a flat plate 150, being loosely secured thereto by bolts 151 so that it is free to rock to a limited degree on the plate, thus to make it self-adjusting. The top of the block 148 has built into it a resistance element r for supplying heat directly to the bottom plate 33 of the mold.

During vulcanization, pressure is applied to the sole blank, both to effect vulcanization and to cause the plastic sole blank to flow laterally and upwardly into contact with the inner surface of the mold halves 31—31, and the bottom side of the last. To produce the required vertical motion, the plate 150 has connected to its underside a boss 152 which extends downwardly through a hole in the bed plate 12. A shaft 154 is threaded at its upper end into the boss and at its lower end into a coupling 156. The coupling includes a ball joint and is fastened to the upper end of a piston rod 160 which extends upwardly from an air cylinder 162. The air cylinder 162 is bolted to a pair of I beams 164 fastened at opposite ends to the sides of the base frame near the bottom. The coupling member 156 provides for vertical adjustment of the shaft 154 and hence vertical travel of the plate 150.

The lasts L briefly described above in connection with their attachment to the shaft 28, are comprised of cast aluminum and may take any one of several forms depending upon the construction of the shoe to be operated upon. In one form as illustrated in Figs. 7 and 8, the last is of conventional shape having a smooth bottom 166 at its forepart. The heel end of the last, however, is provided with a plurality of closely spaced metal pins 37 which project downwardly therefrom. When the upper is string lasted to the last its marginal edge skirts these pins as illustrated in Fig. 6. These pins 37 are forced into the upper surface of the uncured sole blank by upward movement of the mold bottom 33 during the vulcanization and enter the inner surface of the sole blank, forming the holes 35 therein and at the same time transfer vulcanizing heat directly to the sole blank and interiorly thereof at the heel end where it is thick thus speeding up vulcanization at this place, so that vulcanization is completely in the heel end substantially as soon as it is in the forepart. In some cases, for example, where not only the heel end but a considerable portion of the shank is very thick, the last L has additional pins 37 (Fig. 8) located at the shank which make holes in the shank portion of the sole blank during vulcanization. In making a shoe, such as illustrated in Figs. 13 and 14, where the sole is made to look very thick by forming deep walls peripherally of a forepart cavity 39, a last as shown in Figs. 11 or 12, is employed which has fastened to it or formed integral with it a thickened portion 41 which displaces the substance of the sole during vulcanization, squeezing it laterally to form the recess desired and the surrounding walls.

While in most instances the last may easily be moved from the finished shoe, it may be desirable to use a split last of conventional design.

As previously pointed out when the last has a thickened front portion 41 (Fig. 12) or a movable portion 41 (Fig. 11) a mold having a movable bottom may be dispensed with and a mold having a fixed bottom substituted therefor. In such a case the thickened portion or the movable portion as the case may be will produce the necessary pressure to insure vulcanization or fusion of the sole. It is also desirable to point out here that the pressure necessary to effect vulcanization or fusion may be provided non-mechanically that is without moving the bottom of the mold or the last after the two have been brought together by using a blowing agent in the substance of the sole blank which will generate gas during the application of heat sufficiently to expand the sole within the mold thus creating the desired pressure.

The resistance coil in each case is located close to the bottom of the last so that the heat is confined to the bottom of the last and will be transferred only to the inside of the insole. In order to prevent undesirable heat transfer to the upper, the coil support is insulated from the wall of the last by an air gap space or by a suitable insulation at its top and sides. If desired, the pins 37 and the protrusion 41 may also be heated by independent resistance coils.

The pressure system for operating the mold members is as pointed out above, controlled by a three-way valve 132, the latter being ratchet operated by a treadle 166. The valve for effecting operation of the parts is shown in Figs. 21, 22 and 23. In one position of the valve (I) (Fig. 23) air is delivered from a source of air pressure directly to the port 176, thence to a port 178 and from thence to a port 180, the latter being connected to the closing cylinders 100. In the next position (II) (Fig. 21) air is admitted to a port 182 and from thence to a port 184 which is connected to the bottom of the pressure applying cylinder 162. At the same time the ports 176, 178 and 180 are maintained in communication so that air pressure is continuously maintained in the closing cylinders. In the position (III) (Fig. 22) the port 180 is connected to a vent port 186, thereby venting air from the closing cylinders 100 whereupon the springs 106 in the cylinders restore the pistons to their initial position and hence move the mold halves to their inoperative positions. At the same time, the port 184 is connected to a vent 188 which vents the bottom of the pressure cylinder 162 and connects a port 190 to a port 192 so as to deliver air to the top of the pressure cylinder 162. The various positions of the valve are effected as previously stated by depressing the treadle which is connected to a pawl lying on a ratchet fastened to a shaft extending from the valve core. There is a timer as will subsequently appear in the description of the operating circuit which may be manually set visually to indicate passage of time for a predetermined length of time so that at the end of that time, the operator will trip the treadle, thus to release the shoe. While not illustrated herein, the timer may be operably connected by suitable mechanism to the valve 132 to automatically move the same to a position to release the shoe at the end of a predetermined length of time.

The heating circuit for the various resistance coils is shown schematically in Fig. 24, and is controlled by a main closing switch S' on the base of the machine at its front. Closing the switch S' completes the circuit from power lines A—C. Suitable thermostats are incorporated heating circuits to control the temperature of the heating coils independently of the main circuit. Normally the heating elements are left on continually so that the lasts and mold members are kept hot at all times during operation of the machine. There are two resistance coils $r1$ and $r2$, one for each of the lasts. One side of each resistance coil is connected by a lead $l1$ and $l2$ to a common conductor which runs directly to the switch S1. The other side of each coil is connected by leads $l3$ and $l4$, to the opposite side of the switch. Pilot lights $p$ are preferably interposed in these leads to visually indicate the supply of current to the coils. Three resistance coils are provided for the mold parts, one for each of the mold halves and one for the bottom. These coils $r3$, $r4$ and $r5$, are connected by leads $l8$, $l9$ and $l10$ to the opposite side thereof. Pilot lights $p$ are also inserted in these leads. A timing switch T is also included in the main circuit.

Preparatory to attaching soles whether made of rubber or plastic the upper or its equivalent in the case of garments, is gathered at the bottom of a last in appropriate fashion whereupon the latter is moved into position above the mold. A sole blank is then dropped into the mold and the treadle 166 is depressed to bring the mold halves together. The handle 74 is now depressed to draw the lasted upper down into sealing engagement with the rim of the mold cavity and then the treadle 166 is again depressed so as to elevate the bottom 33 provided mechanical pressure is employed during vulcanization. If pressure is to be produced by a blowing agent within the composition of the sole blank, of course, the bottom of the mold need not be designed for elevation. Vulcanization now takes place under pressure and heat during which time the uncured blank S becomes plastic and flows laterally and upwardly to fill the last cavity and to conform to the bottom of the lasted upper. During vulcanization the substance of the sole flows upwardly between the inner edge of the lasting margin and outwardly over its edge in the case where the insole is omitted forming a smooth surface for the bottom of the foot. Where holes are made in the lasting margin or loops are employed, the rubber flows through them making for a firm anchorage. While vulcanization is taking place the operator fastens another upper to the inverted last at the top side of the last. By the time the operator has fastened the upper in place, vulcanization of the shoe in contact with the mold is completed and by depressing the treadle 166, the bottom 33 is drawn downwardly and the mold halves 31 are drawn laterally outward to release the shoe whereupon it is elevated by raising the handle 74 and rotating the last into its inverted position. The foregoing succession of operations is then repeated.

The shoe or other article of footwear manufactured according to the aforesaid method and with the machine described, is characterized principally in that there is a direct attachment of the substance of the sole to the substance of the upper without benefit of mechanical means in the form of stitching or the like or an independent body of adhesive, that there is uniformity of vulcanization of the sole throughout the various parts in spite of the variations in thickness of the sole in the various parts, in the provision of recesses in the inner surface of the sole which provides for reception of padding and the like and in means for ventilating the sole.

It should be understood that the present disclosure is for the purpose of illustration only and that this invention includes all modifications and equivalents which fall within the scope of the appended claims.

I claim:

1. A method of making footwear comprising the steps of holding the lower margin of an upper, which has been mounted on a last, with the margin disposed inwardly against the bottom, between the marginal edge of the bottom of the last and the marginal portion of an uncured sole blank, and vulcanizing the uncured sole blank to the margin of the upper by conductance of heat to the major portion of the inside of the sole blank inwardly of the edge of the inturned margin by direct conductance of heat from the naked heated last bottom to the inner surface of the sole blank.

2. A method according to claim 1, wherein the inturned margin of the upper is connected by transversely extending strands, leaving the major portion of the bottom open so that a major part of the inner surface of the outer sole is exposed to the naked heated surface of the last bottom.

3. A method according to claim 1, wherein the heat transfer from the hot last to the outer sole blank is increased by heat conducting projections of the hot last that penetrate the inner surface of and into the bulk of the sole blank.

4. A method according to claim 1, wherein heat is also supplied to the outside of the outer sole blank but in insufficient amounts to ever cure the outer side of the sole blank.

5. A method according to claim 1, wherein no inner sole or analogous member is included so that with the exception of the marginal portion of the inner sole, which is covered by the inwardly disposed margin of the upper, the entire inner surface of the outer sole has direct contact with the heated bottom surface of the last.

6. A method according to claim 1, wherein an inner sole connects the margins of the upper, said inner sole being perforate so that a major part or parts of the inner surface of the outer sole are thus exposed to the hot last.

(References on following page)

References Cited in the file of this patent

UNITED STATES PATENTS

| | | |
|---|---|---|
| 297,633 | Reynolds | Apr. 29, 1884 |
| 361,628 | Holland | Apr. 19, 1887 |
| 398,358 | Tregurtha | Feb. 19, 1889 |
| 722,822 | Doughty | Mar. 17, 1903 |
| 1,023,718 | Busky | Apr. 16, 1912 |
| 1,276,293 | Warner | Aug. 20, 1918 |
| 1,660,881 | Nielsen | Feb. 28, 1928 |
| 1,719,376 | Johnson | July 2, 1929 |
| 1,860,412 | Glidden et al. | May 31, 1932 |
| 1,863,954 | Wilhelmi | June 21, 1932 |
| 1,885,337 | Dow | Nov. 1, 1932 |
| 1,955,720 | Rollmann | Apr. 17, 1934 |
| 2,103,157 | Jaumandreu | Dec. 21, 1937 |
| 2,338,764 | Hart | Jan. 11, 1944 |
| 2,405,498 | Gregg | Aug. 6, 1946 |
| 2,525,609 | Lewis | Oct. 10, 1950 |
| 2,614,342 | Hoza | Oct. 21, 1952 |
| 2,647,281 | Capdevila | Aug. 4, 1953 |

FOREIGN PATENTS

| | | |
|---|---|---|
| 244,800 | Great Britain | Jan. 6, 1927 |